US012791454B2

(12) United States Patent
Al-Saleh et al.

(10) Patent No.: US 12,791,454 B2
(45) Date of Patent: Nov. 10, 2026

(54) WIRELESS SENSORS FOR MONITORING FLUID QUALITY, PRESSURE AND TEMPERATURE

(71) Applicant: SAUDI ARABIAN OIL COMPANY, Dhahran (SA)

(72) Inventors: Mansour M. Al-Saleh, Dhahran (SA); Mubarak M. Al-Ghubari, Dammam (SA); Zakariya S. Al-Helal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1077 days.

(21) Appl. No.: 17/937,345

(22) Filed: Sep. 30, 2022

(65) Prior Publication Data

US 2024/0110856 A1 Apr. 4, 2024

(51) Int. Cl.

*G01N 3/12* (2006.01)
*G01N 3/06* (2006.01)
*H02J 7/70* (2026.01)

(52) U.S. Cl.

CPC ................. *G01N 3/12* (2013.01); *G01N 3/06* (2013.01); *G01N 2203/0048* (2013.01); *G01N 2203/06* (2013.01); *H02J 7/70* (2026.01)

(58) Field of Classification Search

CPC .... G01N 3/12; G01N 3/06; G01N 2203/0048; G01N 2203/06; H02J 7/70
USPC ........................................................ 73/37
See application file for complete search history.

(56) References Cited

U.S. PATENT DOCUMENTS

| | | | | |
|---|---|---|---|---|
| 6,958,693 | B2 * | 10/2005 | Rothgeb | C02F 1/008 340/539.22 |
| 7,526,944 | B2 | 5/2009 | Sabata et al. | |
| 8,950,242 | B1 * | 2/2015 | Dull | G01M 3/2815 73/40 |
| 10,653,027 | B2 | 5/2020 | van Pol et al. | |
| 10,739,222 | B1 | 8/2020 | Gossio | |
| 11,082,759 | B2 | 8/2021 | Hentschel et al. | |

(Continued)

FOREIGN PATENT DOCUMENTS

EP 3786507 A1 3/2021

OTHER PUBLICATIONS

G. S. Kantaris and N.A. Makris; "Underwater Wireless In-Pipe Communications System", 2015 IEEE International Conference on Industrial Technology; IEEE; Mar. 2015; pp. 1945-1950 (6 pages).

(Continued)

*Primary Examiner* — Marrit Eyassu
(74) *Attorney, Agent, or Firm* — Osha Bergman Watanabe & Burton LLP

(57) ABSTRACT

A method to perform a pressurized test of a pressure retaining equipment is disclosed. The method includes inserting, via a nozzle of the pressure retaining equipment, a waterproof wireless sensor assembly into an enclosed volume of the pressure retaining equipment, closing, subsequent to the inserting, all openings of the pressure retaining equipment except a connection to a pump, applying, by the pump, pressure to a test fluid contained in the enclosed volume, wirelessly transmitting, by the wireless sensor assembly to a computing device external to the pressure retaining equipment, test readings, and analyzing, by the computing device, the test readings to determine a result of the pressurized test.

17 Claims, 6 Drawing Sheets

(56) References Cited

U.S. PATENT DOCUMENTS

| | | | | |
|---|---|---|---|---|
| 11,118,444 | B2 | 9/2021 | Needham | |
| 2005/0145018 | A1* | 7/2005 | Sabata | G01N 17/00 73/49.1 |
| 2011/0178736 | A1* | 7/2011 | Westra | F17D 5/02 702/50 |
| 2012/0176233 | A1 | 7/2012 | Petrucelli et al. | |
| 2014/0326050 | A1* | 11/2014 | Mann | G01M 3/04 73/37 |
| 2015/0179044 | A1 | 6/2015 | Wu et al. | |
| 2019/0186975 | A1* | 6/2019 | Pennebaker, III | G01F 23/80 |

OTHER PUBLICATIONS

Office Action issued in Saudi Arabian Application No. 123450425, mailed on Aug. 25, 2025 (16 pages).

* cited by examiner

WIRELESS SENSORS FOR MONITORING FLUID QUALITY, PRESSURE AND TEMPERATURE

BACKGROUND

A pressure retaining equipment is an equipment (e.g., an assembly or a part) that acts as a barrier between pressure-exerting fluid (e.g., wellbore fluids) and the environment. Failure to function as intended of the pressure retaining equipment results in release of the fluid into the environment. The pressure retaining equipment includes a portion that is exposed to the fluid exerting the pressure that may also be referred to as the pressure containing equipment. A pressurized vessel is an example of a stand-alone pressure retaining equipment. A section of a pipeline transporting fluid (e.g., gas, chemicals, etc.) that is under pressure during normal operations is another example of the pressure retaining equipment.

Pressurized test refers to a process of applying pressure to contained fluid (referred to as the test fluid) while monitoring the fluid parameters such as pressure, temperature, composition, contamination, or other physical/mechanical/chemical properties. The pressurized testing is performed from time to time to verify that the pressure retaining equipment will continue to function as intended within their specifications over the range of applied pressure. Fluid parameters need to be monitored as it may impact or indicate the material condition of the tested equipment.

SUMMARY

In general, in one aspect, the invention relates to a method to perform a pressurized test of a pressure retaining equipment. The method includes inserting, via a nozzle or an entry point of the pressure retaining equipment, a wireless sensor assembly into an enclosed volume of the pressure retaining equipment, closing, subsequent to said inserting, all openings of the pressure retaining equipment except a connection to a pump, applying, by the pump, pressure to a test fluid contained in the enclosed volume, wirelessly transmitting, by the wireless sensor assembly to a computing device external to the pressure retaining equipment, test readings, and analyzing, by the computing device, the test readings to determine a result of the pressurized test.

In general, in one aspect, the invention relates to a wireless sensor assembly for performing a pressurized test of a pressure retaining equipment. The wireless sensor assembly includes at least one sensor that is in contact with a test fluid contained in an enclosed volume of the pressure retaining equipment to acquire test readings during the pressurized test, and a wireless transmitter for wirelessly transmitting the test readings to a computing device external to the pressure retaining equipment, wherein the wireless sensor assembly has a dimension suitable for being inserted into the enclosed volume via a nozzle of the pressure retaining equipment, and wherein the test readings are analyzed by the computing device to determine a result of the pressurized test.

In general, in one aspect, the invention relates to a pressure retaining equipment. The pressure retaining equipment includes at least one enclosure wall fitted with a nozzle of the pressure retaining equipment, an enclosed volume defined be the at least one enclosure wall, and a wireless sensor assembly placed inside the enclosed volume, comprising at least one sensor that is in contact with a test fluid contained in the enclosed volume to acquire test readings during a pressurized test, and a wireless transmitter for wirelessly transmitting the test readings to a computing device external to the pressure retaining equipment, wherein the wireless sensor assembly has a dimension suitable for being inserted into the enclosed volume via the nozzle of the pressure retaining equipment, and wherein the test readings are analyzed by the computing device to determine a result of the pressurized test.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for performing a pressurized test of a pressure retaining equipment. The pressurized test is performed while placing floating or fixed wireless sensors inside the pressure retaining equipment to measure and monitor fluid quality, pressure and temperature. Using such floating or fixed wireless sensors, sensor data is captured and plotted instantaneously to improve decision making based on pass or fail status of the pressurized test. The data can be displayed on computer or mobile devices. In addition, the device provides an alarm to indicate if the pressure is below or above a certain limit or value. Further, these floating or fixed wireless sensors are easy to install and remove from the equipment being tested, and are retrievable and reusable. The use of the device eliminates the need for additional branch connections into the pipe to measure the pressure. Embodiments disclosed herein allow for direct measurement of the medium quality which eliminates fraud in fluid quality reporting and helps in monitoring fluid quality during preservation.

Figure 1A:
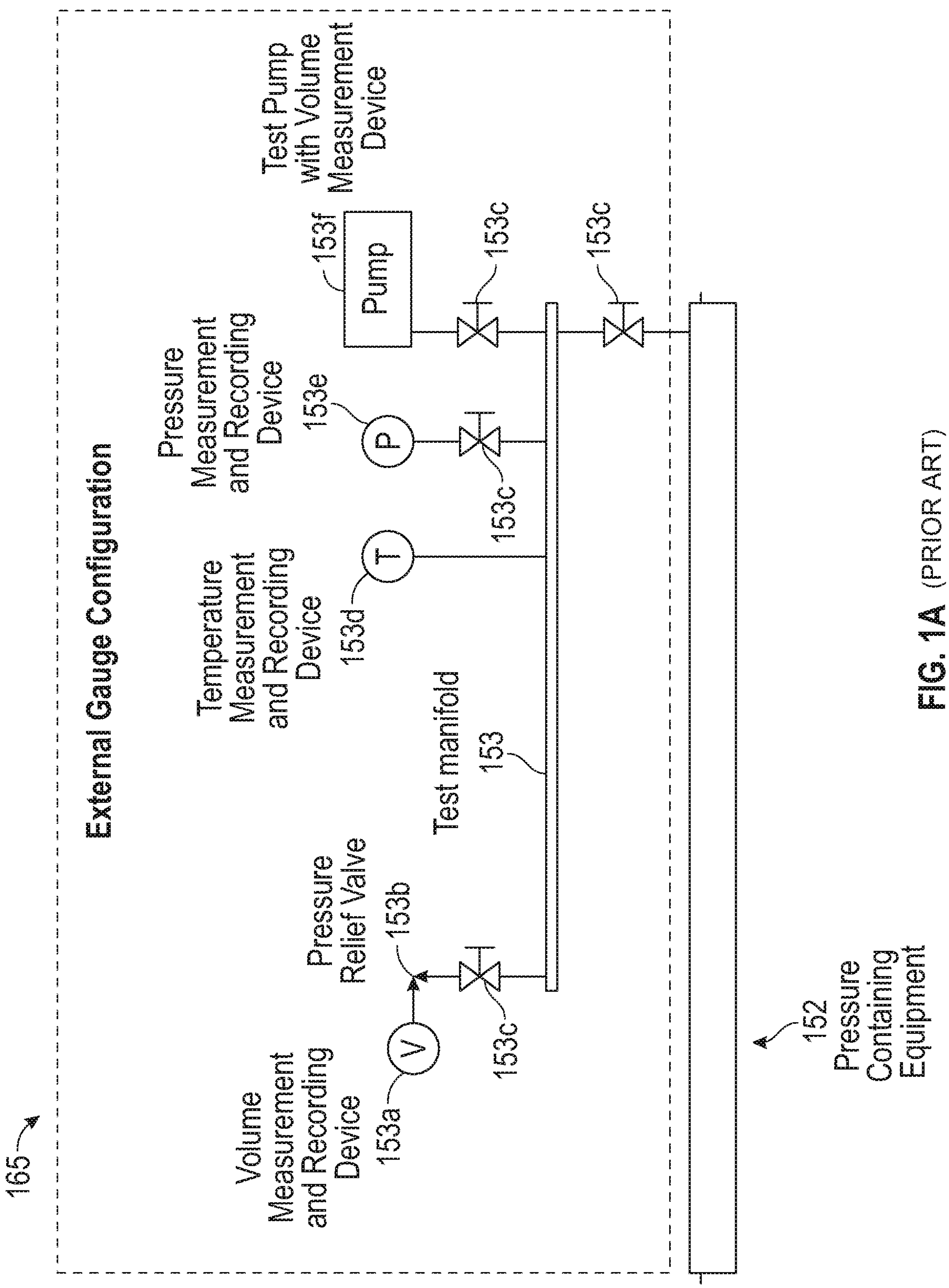
FIG. 1A (PRIOR ART)
FIGS. 1A-1B show a system in accordance with one or more embodiments.

FIG. 1A shows a prior art external gauge configuration (165) for performing pressurized testing of the pressure retaining equipment (152). For example, the pressure retaining equipment (152) may be a pipe or a vessel. Thus, the external gauge configuration (165) is a set up for performing pressurized testing of a pipe or pressurized vessel.

Based on the external gauge configuration (165), a pressurized test may be performed by measuring pressure, temperature, composition, contamination, or other physical/mechanical/chemical properties through external gauges (153*a*, 153*e*, 153*f*) and thermocouples (153*d*). External pressure gauges (153*a*, 153*e*, 153*f*) and thermocouples (153*d*) are installed on the external surface of the equipment, such as the pressure retaining equipment (152). Alternatively, the pressure gauges and thermocouples may be installed at an optional pressurized testing manifold (153) connected to the pressure retaining equipment (152) via branch connections and associated valves (153*b*, 153*c*). Fluid quality is measured before the pressurized test and the record may be filled manually.

To perform the pressurized test, the enclosed volume is initially filled with the test fluid, typically water, and then isolated. A test pump, typically a reciprocating pump, is used to deliver additional volume of the test fluid to increase the pressure in the enclosed volume to reach the desired test pressure value. A pass/fail result of the pressurized test is determined based on visual inspection in addition to measuring and monitoring several parameters during the test. The "failure" status of the test is destructive, resulting in yield or rupture of the equipment under test. For example, the pressurized test failure may be a result of small defects developed during the equipment manufacturing leading to test fluid leakage. The leaked quantity and associated pressure drop depend on the defect size and the duration of the pressurized test.

A determination is made at the conclusion of the pressurized test regarding pass or fail status. The outcome of the pressurized test may also be inconclusive in the external gauge configuration (165). For example, minor pressure drops may be caused by volumetric expansion of the pipe due to plastic yielding, dispensing fluid through the relief valve, or decrease in the fluid temperature. Such inconclusive test data requires additional time for review or repeat of the test due to the lack of direct measurement of the test fluid, temperature, and pressure. In particular, temperature is measured on the external pipe surface, and manually captured and compiled. Further, the fluid quality measurements may be tempered or compromised due to source contamination that may change over time. Other deficiencies of the external gauge configuration (165) include requiring mechanical tools and additional branch connections for installation and removal of the temperature and pressure gauges, as well as lack of support for monitoring water quality used for pressure retaining equipment preservation. The pressure retaining equipment preservation refers to preserving the interior walls of the pressure retaining equipment (152) against corrosion caused by any remaining test fluid after completion of the pressurized test.

Figure 1B:
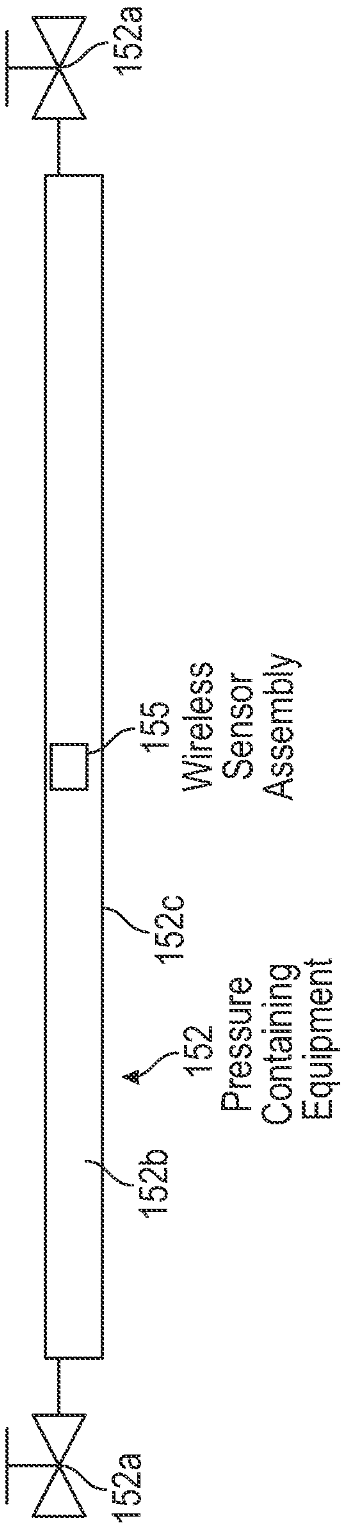

FIG. 1B shows details of the pressure retaining equipment (152) in accordance with one or more embodiments disclosed herein. In one or more embodiments, one or more of the modules and/or elements shown in FIG. 1B may be omitted, repeated, and/or substituted. Accordingly, embodiments disclosed herein should not be considered limited to the specific arrangements of modules and/or elements shown in FIG. 1B.

In comparison to the conventional pressurized test configuration shown in FIG. 1A, a wireless sensor assembly (155) may be used as an internal sensor that provides direct measurement of the fluid quality which eliminates fraud in fluid quality reporting and helps in monitoring fluid quality during pressure retaining equipment preservation. Using the internal sensor as described below eliminates the need for additional branch connections and associated valves (153*b*, 153*c*) to the pressure retaining equipment (152). In one or more embodiments, the external gauges (153*a*, 153*e*, 153*f*), valves (153*b*, 153*c*), thermocouples (153*d*), and pressurized testing manifold (153) are entirely eliminated using the internal sensor.

As shown in FIG. 1B, the pressure retaining equipment (152) includes conduits (152*a*) to control fluid flow into and exit from an enclosed volume (152*b*) bounded by enclosure walls (152*c*). For example, the enclosed volume (152*b*) and the enclosure walls (152*c*) may correspond to a pressurized vessel under test. In another example, the enclosed volume (152*b*) and the enclosure walls (152*c*) may correspond to a section of a pipe isolated using stoppers. The conduits (152*a*) penetrate the enclosure walls (152*c*) and are activated by valves or other mechanical means to control the fluid flow and to apply pressure to the test fluid inside the enclosed volume (152*b*). In the example of the isolated pipe, the stoppers are part of the enclosure walls (152*c*) where the conduits (152*a*) penetrate. For example, the pressure may be applied via a pump (not shown) disposed upstream to the conduits (152*a*). The conduits (152*a*) also allow a wireless sensor assembly (155) to be inserted into or removed from the enclosed volume (152*b*) of the pressure retaining equipment (152).

In one or more embodiments, the wireless sensor assembly (155) includes a fluid quality analyzer, and wireless pressure and temperature sensors that are able to collect fluid quality data, pressure, and temperature readings during pressurized testing of the pressure retaining equipment (152). For example, the wireless sensor assembly (155) may transmit the readings through a wireless means to a smart phone application or a remote server in the Cloud for analysis to determine the pressurized test pass or fail status. In some embodiments, the smart phone or the remote server may include a computer device (e.g., mobile phone) that is similar to the computer device (400) described below with regard to FIG. 4 and the accompanying description.

In one or more embodiments, the wireless sensor assembly (155) may have a round shape (e.g., a ball, button, etc.) that is placed inside a protection cage. The protection cage is connected or linked to the pressure retaining equipment (152) through a rope, magnet, or any other suitable attachment mechanisms. For example, the rope, magnet, or other attachment mechanism may be linked to the inner side of the enclosure walls (152*c*) or to a blind flange that isolate the pipe under test. The protection cage is constructed with openings to allow test fluid flowing freely between the interior and exterior of the protection cage so as to render the wireless sensor assembly (155) fully exposed to the test fluid throughout the enclosed volume (152*b*). The fluid quality measures (such as pH and chloride content for water), and pressure and temperature readings are analyzed to validate the equipment integrity during the pressurized test. In one or more embodiments, the wireless sensor assembly (155) includes or is capsulated in a lower density material than the density of the test fluid and is buoyant in the test fluid to facilitate retrieval of the wireless sensor assembly (155) at the end of pressurized test for future use. Alternatively, the protection cage may be buoyant in the test fluid to provide floatation to the wireless sensor assembly (155). In particular, the wireless sensor assembly (155) may be retrieved from the pressure retaining equipment (152) through one of the conduits (152*a*) at or near the top of the pressure retaining equipment (152). The wireless sensor assembly (155) is waterproof, powered by rechargeable batteries, and is activated by a user to initiate charging and testing.

Figure 2:
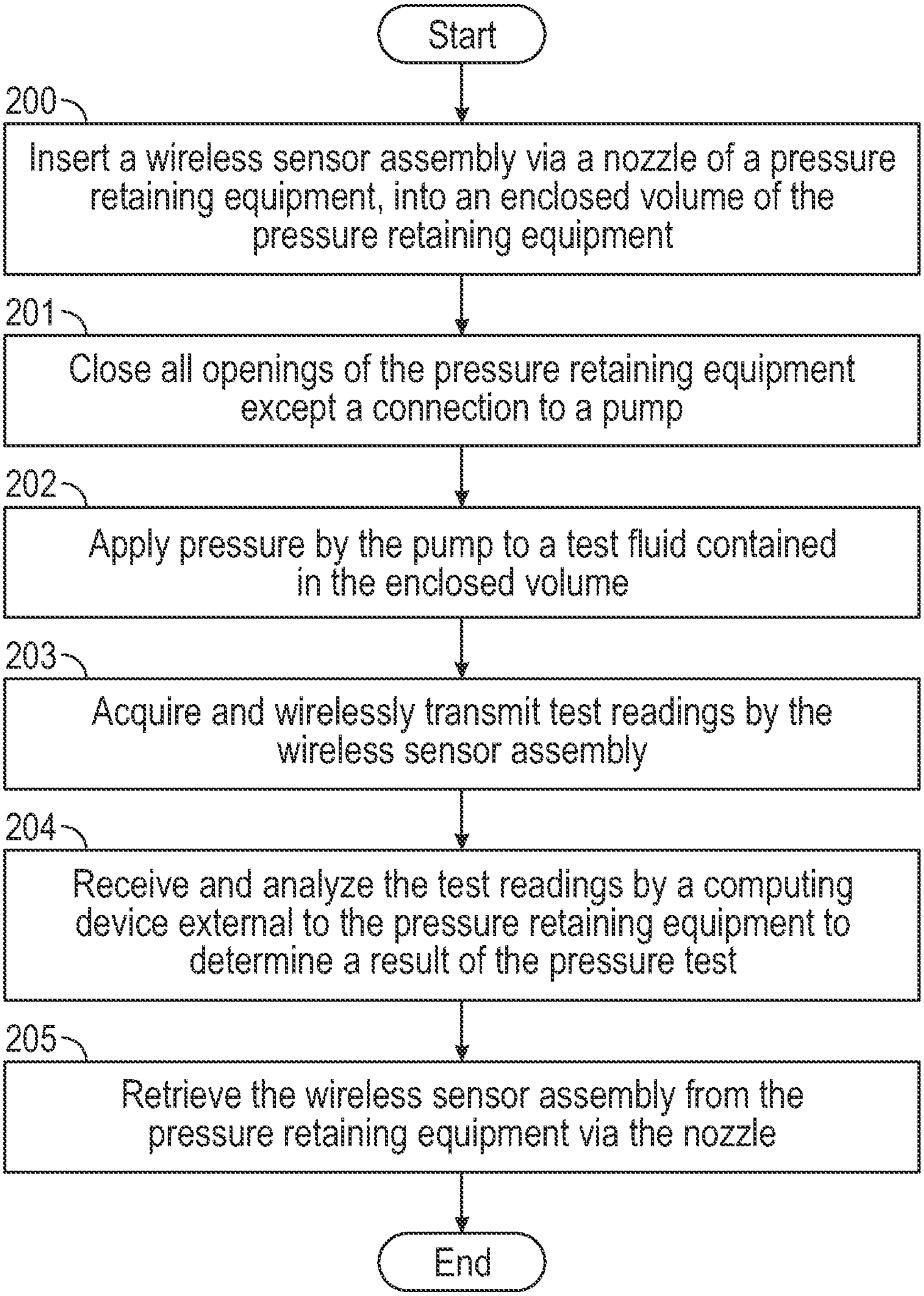
FIG. 2 shows a method flowchart in accordance with one or more embodiments.

FIG. 2 shows a flowchart in accordance with one or more embodiments disclosed herein. In particular, the method flowchart corresponds to performing a pressurized test of a pressure retaining equipment using a wireless sensor assembly. One or more of the steps in FIG. 2 may be performed by the components discussed above in reference to FIGS. 1A-1B. In one or more embodiments, one or more of the steps shown in FIG. 2 may be omitted, repeated, and/or performed in a different order than the order shown in FIG. 2. Accordingly, the scope of the disclosure should not be considered limited to the specific arrangement of steps shown in FIG. 2.

Referring to FIG. 2, initially in Step 200, the wireless sensor assembly is inserted, via a nozzle of the pressure retaining equipment, into an enclosed volume of the pressure retaining equipment. In one or more embodiments, the wireless sensor assembly is placed, prior to being inserted into the enclosed volume, inside a protection cage. In one or more embodiments, the wireless sensor assembly is coupled, via a magnet in the wireless sensor assembly or in the protection cage, to an inner wall of the pressure retaining equipment in a vicinity (e.g., within one foot) of the nozzle.

In Step 201, subsequent to inserting the wireless sensor assembly into the enclosed volume of the pressure retaining equipment, all openings of the pressure retaining equipment are closed except a connection to a pump. For example, a pipe or pipeline may be closed at both ends by blind flanges or valves in the closed position. A pressure vessel with openings may be closed with blind flanges.

In Step 202, in response to closing all the openings, pressure is applied by the pump to a test fluid contained in the enclosed volume.

In Step 203, test readings are acquired using a sensor of the wireless sensor assembly. Specifically, the pressure retaining equipment is being tested for how much pressure the equipment can withstand. The sensor is in contact directly with the test fluid in the configuration without the protection cage. Alternatively, the sensor is in contact with the test fluid passing through at least one opening of the protection cage. In one or more embodiments, the sensor includes one or more of a pressure sensor, a temperature sensor, and a fluid quality sensor that acquire the pressure reading, temperature reading, or fluid quality reading of the test fluid. Accordingly, the test readings are wirelessly transmitted by the wireless sensor assembly to a computing device external to the pressure retaining equipment.

In Step 204, the test readings are analyzed by a computing device to determine a result of the pressurized test. In one or more embodiments, the pressure readings, temperature readings, and/or fluid quality readings over a testing period may be compared to pre-determined profiles or test thresholds. The comparison result may indicate a fluid leak or other comprised condition of the pressure retaining equipment beyond its manufacturing specification. The test result may be Boolean (pass/fail) or other suitable result indicating whether the equipment is capable of handling pressure.

In Step 205, subsequent to completing the pressurized test, the wireless sensor assembly is retrieved from the pressure retaining equipment via the nozzle. In one or more embodiments, at least one of the wireless sensor assembly and the protection cage includes or is capsulated in a lower density material than the test fluid. The lower density provides buoyancy of the wireless sensor assembly to facilitate being retrieved via the nozzle from the pressure retaining equipment.

In one or more embodiments, the pressure retaining equipment may be installed in a well prior to the pressurized test. In other words, the pressurized test is performed in-situ while the pressure retaining equipment is at a downhole location in the well. In such embodiments, the computing device corresponds to a data gathering and analysis system associated with the well, and the result of the pressurized test is used to facilitate a wellbore operation of the well. For example, if the result of the pressurized test shows a failure of the pressure retaining equipment beyond its specification, a repair operation is initiated for the pressure retaining equipment.

In one or more embodiments, the pressure retaining equipment may be installed at a wellsite, a refinery plant, a fluid transportation network, or other part of a oil/gas field based on a "pass" result of the pressurized test indicating the pressure retaining equipment as conforming to its specification. In contrast, the "fail" result will cause the pressure retaining equipment to be rejected or sent to a repair operation.

Figure 3A:
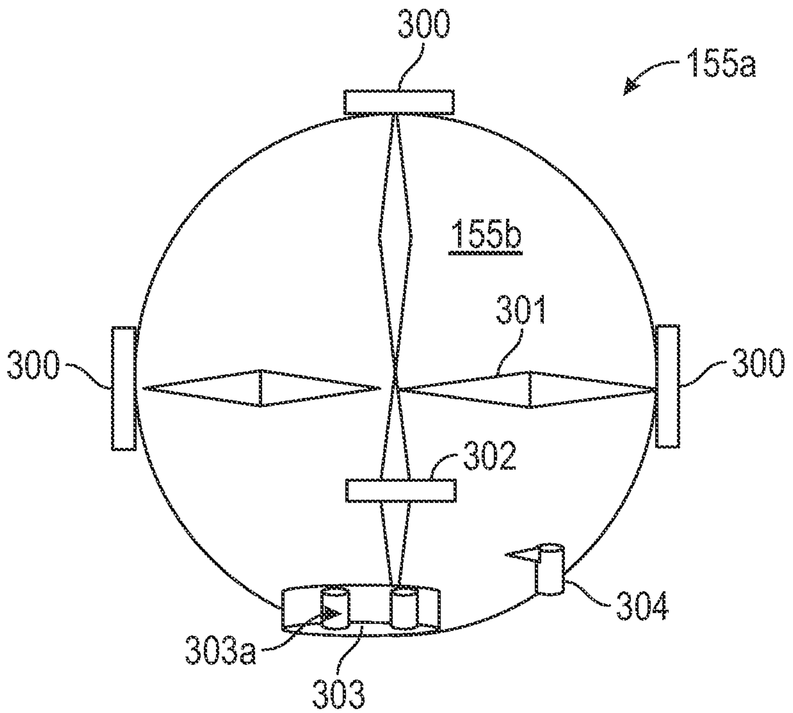
FIGS. 3A, 3B, and 3C show examples in accordance with one or more embodiments.
Figure 3B:
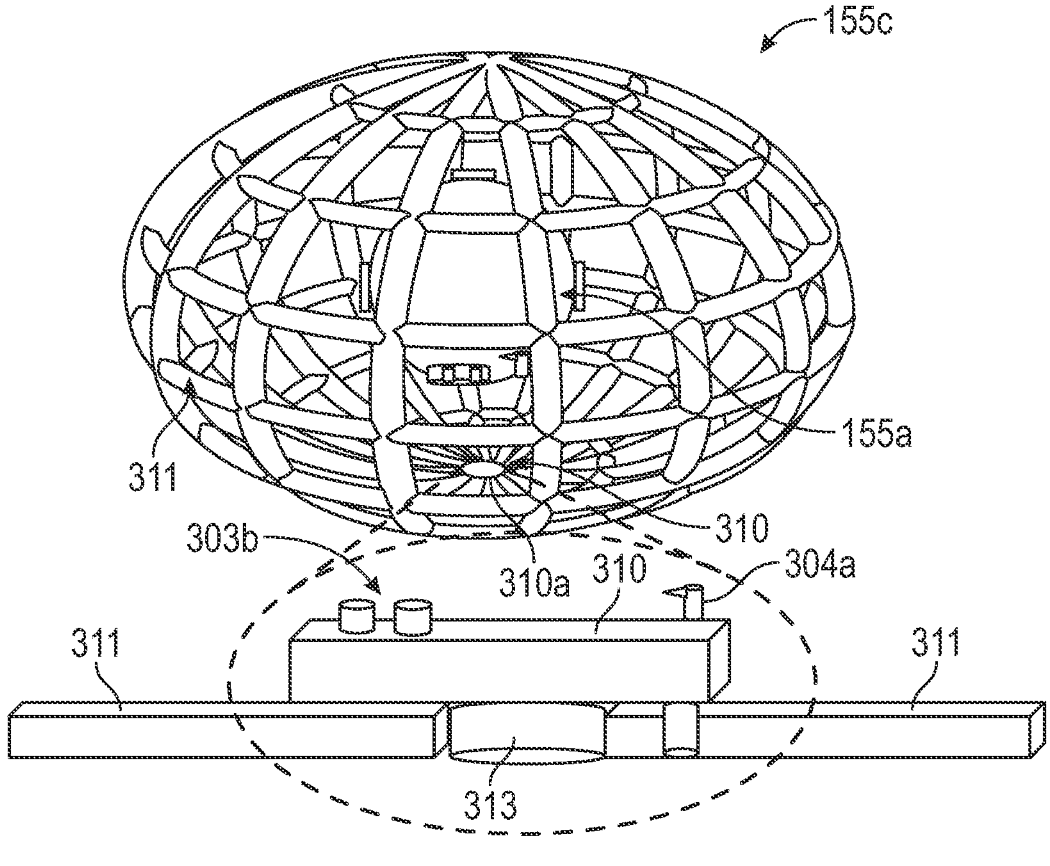
Figure 3C:
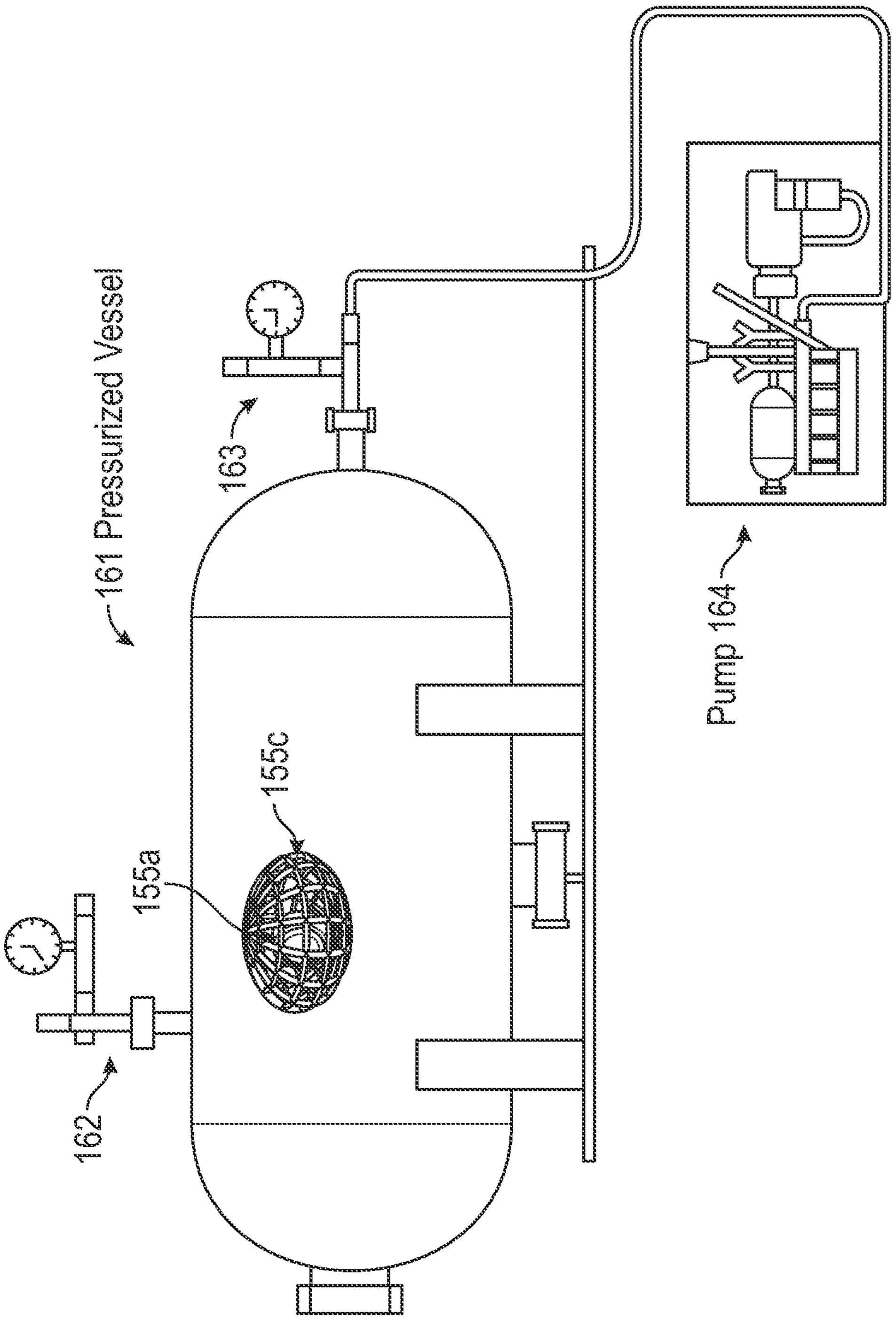

FIGS. 3A, 3B, and 3C show an implementation example in accordance with one or more embodiments. The implementation example shown in FIGS. 3A, 3B, and 3C is based on the system and method flowchart described in reference to FIGS. 1B and 2 above. In one or more embodiments, one or more of the modules and/or elements shown in FIGS. 3A, 3B, and 3C may be omitted, repeated, and/or substituted. Accordingly, embodiments disclosed herein should not be considered limited to the specific arrangements of modules and/or elements shown in FIGS. 3A, 3B, and 3C.

FIG. 3A shows a cross-sectional view of a floating sensor assembly (155*a*), which is an example implementation of the wireless sensor assembly (155) depicted in FIG. 1B above. As shown in FIG. 3A, the floating sensor assembly (155*a*) is made from lightweight nonmetallic compressible or non-compressible high-pressure resistant material (155*b*) to maintain structural integrity of the floating sensor assembly (155*a*) under pressure reaching up to 15000 psi. In one or more embodiments, sensors (300) are embedded or otherwise attached around the surface of the high-pressure resistant material (155*b*) and are secured using fixing nails (301) (e.g., non-metallic rigid structural supporting elements) that extend throughout the interior of the high-pressure resistant material (155*b*). The rigid structural supporting elements secure the sensors (300) and mitigate pressure induced contraction of the high-pressure resistant material (155*b*) during the pressurized test. For example, the fixing nails (301) may prevent the sensors (300) from separating from the high-pressure resistant material (155*b*) under the extreme pressure, or reduces the extent of the pressure induced contraction.

The sensors (300) are powered by a rechargeable battery (303) having a pair of charging pins (303*a*) as electrical terminals for passing charging current. A fixing point (304) is a mechanical or magnetic locking mechanism to lock the high-pressure resistant material (155*b*) against a charging station to facilitate charging of the rechargeable battery (303). The sensors (300) are coupled to a processing unit (302) for processing and transmitting sensor measurements as test readings to a computing device external to the pressure retaining equipment under test. Data communication links to the processing unit (302) and electrical connections to the rechargeable battery (303) may be routed from the sensors (300) along or inside the fixing nails (301). The processing unit (302) may be based on or similar to the computing device described in reference to FIG. 4 below.

In one or more embodiments, the floating sensor assembly (155*a*) is placed inside a protection cage (155*c*) shown in FIG. 3B. As shown in FIG. 3B, the protection cage (155*c*) is constructed from structural elements (311) with large openings between the interior and exterior of the protection cage (166*c*). For example, the protection cage (155*c*) may have a mesh wall. With such large openings, the floating sensor assembly (155*a*), when placed inside the protection cage (155*c*), is fully exposed to the test fluid throughout the enclosed volume of the pressure retaining equipment under test. The dimensions of the openings of the protection cage (155*c*) are smaller than the dimensions of the floating sensor assembly (155*a*) such that the floating sensor assembly (155*a*) remains inside the protection cage (155*c*). In one or more embodiments, the floating sensor assembly (155*a*) includes or is capsulated in a lower density material that is less than the density of the testing fluid and is buoyant during the pressurized test to facilitate retrieving the floating sensor assembly (155*a*) upon completing the pressurized test. In one or more embodiments, the protection cage (155*c*) provides buoyancy to the floating sensor assembly (155*a*) to facilitate retrieving the floating sensor assembly (155*a*) placed inside the protection cage (155*c*) upon completing the pressurized test. For example, the floating sensor assembly (155*a*) with the protection cage (155*c*) may float toward and be retrieved from an opening at or near the top of the pressure retaining equipment under test.

In one or more embodiments, the protection cage (155*c*) is provided with a charging station (310). In the example shown in FIG. 3B, the charging station (310) is attached to the cage elements (311) at the bottom of the protection case (155*c*). As shown in the expanded view (310*a*), the charging station (310) includes a pair of charging points (303*b*), a fixing pin (304*a*), and a sensor activation button (313) for performing charging operation for the floating sensor assembly (155*a*). The charging points (303*b*) are electrical terminals for passing charging current. The fixing pin (304*a*) is a mechanical or magnetic locking mechanism to lock the floating sensor assembly (155*a*) to or against the charging station (310). To initiate charging, the floating sensor assembly (155*a*) is placed in a charging position abutting against the charging station (310) and secured by mechanically or magnetically engaging the fixing point (304) and the fixing pin (304*a*). For example, the floating sensor assembly (155*a*) may be guided into the charging position by a user (e.g., using fingers or guide rods) manually through openings of the protection cage (155*c*).

In another example embodiment, the floating sensor assembly (155*a*) may be guided into the charging position by gravity along a pre-defined geometry such as a spiral guiding ramp integrated into the cage elements (311). The sensor activation button (313) is used to control the charging sequence and lock/unlock the floating sensor assembly (155*a*). For example, a single push of the sensor activation button (313) by a user may engage the fixing point (304) and the fixing pin (304*a*) to lock the floating sensor assembly (155*a*) before initiating charging. In contrast, a double push of the sensor activation button (313) by the user may stop charging and disengage the fixing point (304) and the fixing pin (304*a*) to unlock/release the floating sensor assembly (155*a*). Once unlocked and placed inside the pressure retaining equipment under test, the floating sensor assembly (155*a*) may float away freely from the charging station (310) due to buoyancy from the test fluids. The floating sensor assembly (155*a*) freely floating inside the protection cage (155*b*) during the pressurized test reduces obstruction to the test fluids flowing pass the sensor (300) and improves measurement accuracy, e.g., by reducing any turbulent fluid flow.

FIG. 3C shows an example where the pressure retaining equipment is a pressurized vessel (161) and the pressurized test is performed without any components of the external gauge configuration (165) depicted in FIG. 1B above. The floating sensor assembly (155*a*) with the protection cage (155*c*) is inserted through the top-side nozzle (162) prior to the pressurized test and also collected through the top-side nozzle (162) once the pressurized test is completed. The floating sensor assembly (155*a*) with the protection cage (155*c*) has an exterior dimension that is smaller than the opening of the top-side nozzle (162) to allow such insertion and collection through the top-side nozzle (162). The floating sensor assembly (155*a*) and/or the protection cage (155*c*) may be connected to the inner wall of the pressurized vessel (161) near the top-side nozzle (162) by a rope or a magnet to facilitate collection through the top-side nozzle (162). In this context, the floating sensor assembly (155*a*) is a fixed assembly, as it may be limited in movement inside the café (155*c*).

After the floating sensor assembly (155*a*) with the protection cage (155*c*) is inserted into the pressurized vessel (161), all opening and valves in the pressurized vessel (161) are closed except the pumping point (163). The pump (164) is operated to pressurize the vessel (161). Once the required pressure is achieved, the pumping (164) stops, and test readings transmitted from the floating sensor assembly (155*a*) are monitored and/or analyzed to determine the pressurized test result. Once the pressurized test is completed, the discharge nozzle is opened to depressurize the vessel (161). After the vessel (161) is depressurized or the test fluid discharges, the floating sensor assembly (155*a*) with the protection cage (155*c*) is retrieved through the top-side nozzle (162).

Although the pressurized test is described with respect to a stand-alone pressurized vessel, the description above applies equally well to a pressure retaining equipment located at a downhole location in a well, such as a section of a drill pipe isolated using stoppers. In the latter case, the top-side nozzle (162) may be integrated with a stopper such that the floating sensor assembly (155*a*) may be retrieved through the top-side nozzle (162) into the drill string and eventually collected at the Earth surface.

Embodiments described above have the following advantages: (i) direct measurement of the test fluid quality, temperature, and pressure that are representative and accurate, (ii) eliminating additional branch connections into the pipe/equipment to measure the pressure, which maintains pipe integrity, (iii) wireless data transmission eliminating the need of pressure gauges and thermocouples, (iv) instantaneous data capture improving decision making regarding test pass or fail, (v) retrievable and reusable test equipment, and (vi) allowing monitoring of water quality used for pressure retaining equipment preservation.

Figure 4:
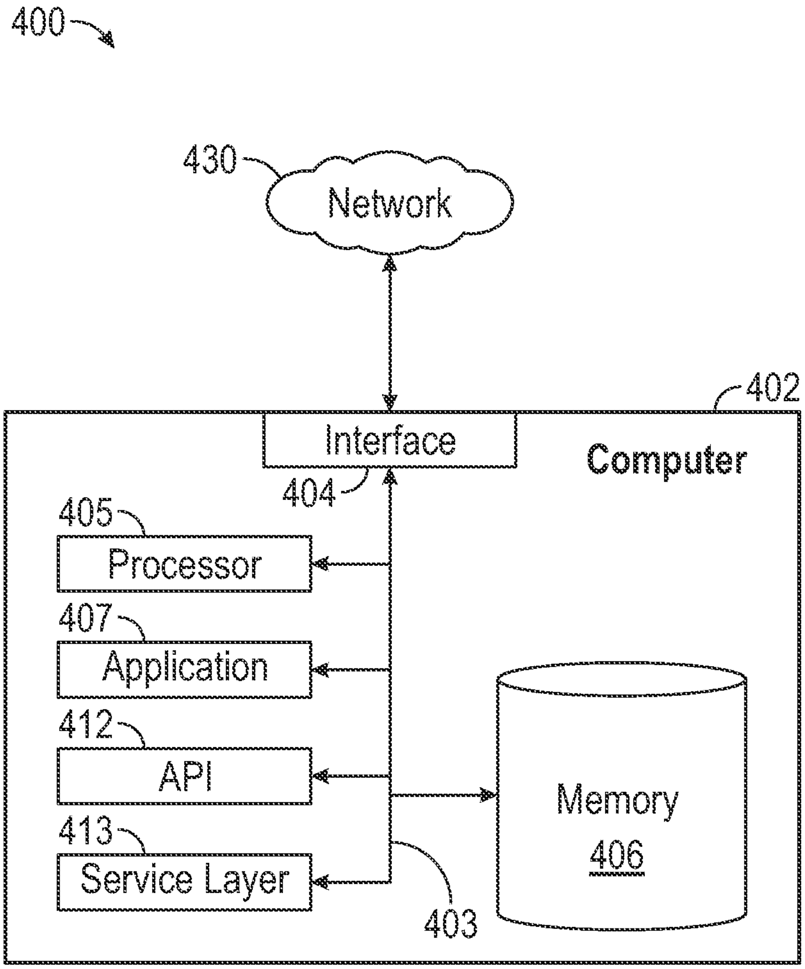
FIG. 4 shows a computing system in accordance with one or more embodiments.

Embodiments may be implemented on a computing device. FIG. 4 depicts a block diagram) of a computing device (400) including a computer (402) used to provide computational functionalities associated with described machine learning networks, algorithms, methods, functions, processes, flows, and procedures as described in this disclosure, according to one or more embodiments. The illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402)) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols, such as the Wellsite Information Transfer Specification (WITS) protocol, associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing a computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

While the invention has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed:

1. A method to perform a pressurized test of a pressure retaining equipment, comprising:

placing a waterproof wireless sensor assembly inside a protection cage;

inserting, via a nozzle or an entry point of the pressure retaining equipment, the waterproof wireless sensor assembly into an enclosed volume of the pressure retaining equipment;

coupling, via a magnet in the wireless sensor assembly or in the protection cage, the wireless sensor assembly to an inner wall of the pressure retaining equipment in a vicinity of the nozzle;

closing, subsequent to said inserting, all openings of the pressure retaining equipment except a connection to a pump;

applying, by the pump, pressure to a test fluid contained in the enclosed volume;

wirelessly transmitting in real-time, by the wireless sensor assembly to a computing device external to the pressure retaining equipment, test readings;

analyzing, by the computing device, the test readings to determine a result of the pressurized test; and perform, based on the result of the pressurized test, a pre-determined operation;

wherein at least one of the wireless sensor assembly and the protection cage includes or is capsulated in a lower density material than the test fluid, and wherein the lower density material provides buoyancy of the wireless sensor assembly to facilitate retrieving of the wireless sensor assembly from the pressure retaining equipment.

2. The method of claim 1, further comprising:

retrieving, via the nozzle or an exit point and subsequent to completing the pressurized test, the wireless sensor assembly from the pressure retaining equipment.

3. The method of claim 2, acquiring, using a sensor of the wireless sensor assembly, the test readings, wherein the sensor is in contact with the test fluid that passes through at least one opening of the protection cage, and wherein the sensor comprises at least one of a pressure sensor, a temperature sensor, and a fluid quality sensor.

4. The method of claim 3, wherein the protection cage comprises a mesh wall, and wherein the at least one opening is an opening of the mesh wall.

5. The method of claim 4, wherein the waterproof wireless sensor assembly is constructed from a lightweight nonmetallic high-pressure resistant material and has a dimension larger than the size of the opening of the mesh wall, and wherein the sensor is installed on a support structure implanted in the lightweight nonmetallic high-pressure resistant material to secure the sensor and mitigate a pressure induced contraction during the pressurized test.

6. The method of claim 5, further comprising:

initiating, by placing the wireless sensor assembly in a charging position butting a charging station that is integrated with the protection case, charging of a rechargeable battery of the wireless sensor assembly; and subsequent to charging the rechargeable battery and using an activation button of the charging station, activating the wireless sensor assembly inside the protection cage and releasing the wireless sensor assembly from the charging station.

7. A wireless sensor assembly for performing a pressurized test of a pressure retaining equipment, comprising:

a protection cage encased around at least one sensor, wherein the protection cage is suitable for being inserted into an enclosed volume of the pressure retaining equipment via a nozzle;

the at least one sensor that is encased within the protection cage and in contact with a test fluid contained in the enclosed volume of the pressure retaining equipment to acquire test readings during the pressurized test;

a magnet in the protection cage coupled to an inner wall of the pressure retaining equipment in a vicinity of the nozzle; and a wireless transmitter for wirelessly transmitting the test readings to a computing device external to the pressure retaining equipment, wherein the wireless sensor assembly has a dimension suitable for being inserted into the enclosed volume via a nozzle of the pressure retaining equipment, and wherein the test readings are analyzed by the computing device to determine a result of the pressurized test;

wherein at least one of the wireless sensor assembly and the protection cage includes or is capsulated in a lower density material than the test fluid, and wherein the lower density material provides buoyancy of the wireless sensor assembly to facilitate retrieving of the wireless sensor assembly from the pressure retaining equipment.

8. The wireless sensor assembly of claim 7, wherein the wireless sensor assembly is retrieved, via the nozzle and subsequent to completing the pressurized test, from the pressure retaining equipment.

9. The wireless sensor assembly of claim 8, wherein the at least one sensor is in contact with the test fluid that passes through at least one opening of the protection cage, and wherein the at least one sensor comprises at least one of a pressure sensor, a temperature sensor, and a fluid quality sensor.

10. The wireless sensor assembly of claim 9, wherein the protection cage comprises a mesh wall, and wherein the at least one opening is an opening of the mesh wall.

11. The wireless sensor assembly of claim 10, wherein the wireless sensor assembly is constructed from a lightweight nonmetallic high-pressure resistant material and has a dimension larger than the size of the opening of the mesh wall, and wherein the at least one sensor is installed on a support structure implanted in the lightweight nonmetallic high-pressure resistant material to secure the at least one sensor and mitigate a pressure induced contraction during the pressurized test.

12. The wireless sensor assembly of claim 11, further comprising:

a charging station that is integrated with the protection case, wherein charging of a rechargeable battery of the wireless sensor assembly is initiated by placing the wireless sensor assembly in a charging position butting the charging station, and wherein subsequent to charging the rechargeable battery, the wireless sensor assembly is activated inside the protection cage and released from the charging station using an activation button of the charging station.

13. A pressure retaining equipment, comprising:

at least one enclosure wall fitted with a nozzle of the pressure retaining equipment;

an enclosed volume defined be the at least one enclosure wall; and a wireless sensor assembly placed inside the enclosed volume, comprising:

a protection cage encased around at least one sensor, wherein the protection cage is suitable for being inserted into an enclosed volume of the pressure retaining equipment via a nozzle;

the at least one sensor that is encased within the protection cage and in contact with a test fluid contained in the enclosed volume of the pressure retaining equipment to acquire test readings during the pressurized test;

a magnet in the protection cage coupled to an inner wall of the pressure retaining equipment in a vicinity of the nozzle; and a wireless transmitter for wirelessly transmitting the test readings to a computing device external to the pressure retaining equipment, wherein the wireless sensor assembly has a dimension suitable for being inserted into the enclosed volume via a nozzle of the pressure retaining equipment, and wherein the test readings are analyzed by the computing device to determine a result of the pressurized test;

wherein at least one of the wireless sensor assembly and the protection cage includes or is capsulated in a lower density material than the test fluid, and wherein the lower density material provides buoyancy of the wireless sensor assembly to facilitate retrieving of the wireless sensor assembly from the pressure retaining equipment.

14. The pressure retaining equipment of claim 13, wherein the wireless sensor assembly is retrieved, via the nozzle and subsequent to completing the pressurized test, from the pressure retaining equipment.

15. The pressure retaining equipment of claim 13, wherein the at least one sensor is in contact with the test fluid that passes through at least one opening of the protection cage, and wherein the at least one sensor comprises at least one of a pressure sensor, a temperature sensor, and a fluid quality sensor.

16. The pressure retaining equipment of claim 15, wherein the protection cage comprises a mesh wall, and wherein the at least one opening is an opening of the mesh wall.

17. The pressure retaining equipment of claim 16, wherein the wireless sensor assembly is constructed from a lightweight nonmetallic high-pressure resistant material and has a dimension larger than the size of the opening of the mesh wall, and wherein the at least one sensor is installed on a support structure implanted in the lightweight nonmetallic high-pressure resistant material to secure the at least one sensor and mitigate a pressure induced contraction during the pressurized test.

* * * * *